Aug. 19, 1958 R. MANNAIONI 2,848,085
ELECTROMAGNETS AND MORE PARTICULARLY
IN ELECTROMAGNETIC CLUTCHES
Filed June 11, 1956

INVENTOR:
RIGHETTO MANNAIONI
by
Richardson, Davis and Nordon
Atty's.

United States Patent Office 2,848,085
Patented Aug. 19, 1958

2,848,085

ELECTROMAGNETS AND MORE PARTICULARLY IN ELECTROMAGNETIC CLUTCHES

Righetto Mannaioni, Florence, Italy

Application June 11, 1956, Serial No. 590,706

Claims priority, application Italy April 28, 1956

2 Claims. (Cl. 192—84)

Electromagnetic clutches or couplings are known which are designed to effect a variation of speed through a variation of a gear ratio, or to engage and disengage a rotary member, or to engage and restrain a rotary member or the like. Electromagnets are also known which control operating mechanical members. The present invention relates to such clutches although it is intended that the improvements shall be extended to all devices including electromagnets for mechanical controls.

Such clutches are generally provided with an electromagnetic core, magnetizable by a coil or solenoid, a movable armature subjected to the electromagnetic effect of the core, and members controlled by the armature and adapted to effect or release the couplings, such as friction plates or the like.

The use of devices of this kind, for instance, in machine tools or in other applications, has hitherto been hampered owing to the magnetization which is transmitted into the metallic members of the machine from a core connected to the coil or solenoid and forming a section of the electromagnet.

The present invention relates to improvements in electromagnetic clutches or couplings or other mechanical devices connected to electromagnetic members, such improvements tending to avoid the disadvantage of the magnetization of the machine members.

An improved clutch according to the invention includes two substantially concentric coils or solenoids instead of one as in existing clutches, traversed by an electric current in such a direction as to determine the magnetization of the core but to annul the leakages of magnetism outside the core, this being effected owing to the mutual effect which is established between the two solenoids.

An electromagnet according to the present invention is formed by a ferromagnetic core wherein there are provisions for the concentric and coaxial housings for two windings, which are electrically interconnected so as to provide two magnetic fields, one having a left hand direction and the other having a right hand direction, adapted to be added in the zone of the ferromagnetic core, included between the two concentric or coaxial annular housings, and to be subtracted on the outside of the two housings in order to annul the magnetism which otherwise would leak out into the mechanical members of the machine.

The two housings are sufficiently and radially spaced from each other as to form the core to be magnetized and designed to co-operate with the armature through its own annular surface included between the two housings. Externally of the outer housing and internally of the inner housing, the core may be of relatively very small thickness. Electromagnets, such as herein described, may be opposed in order to act in the two directions on a single armature which may also, in certain cases, not materially contact the electromagnets, in which case the electromagnet or electromagnets, for instance, may be stationary, this facilitating their supply and the rotary armature.

The two windings of an electromagnet may be inserted in the supply circuit in cascade, that is in series or in parallel, always taking into account the direction of the windings for the above mentioned purposes.

The accompanying drawing shows an actuation for a simple electromagnetic clutch and a clutch provided with two opposed electromagnets.

Figure 1:
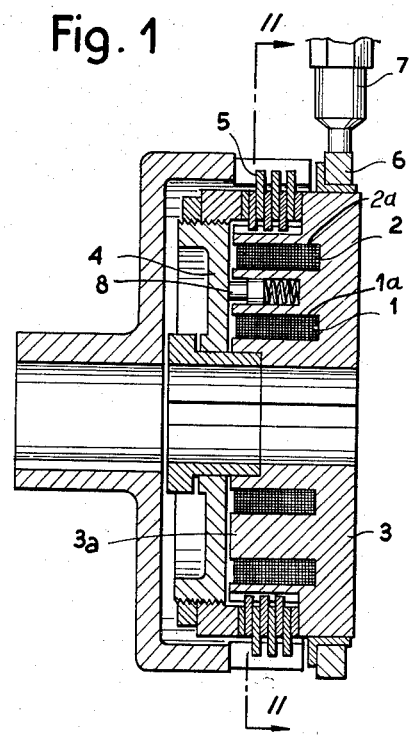
Fig. 1 is a diametrical section of a simple clutch.
Figure 2:
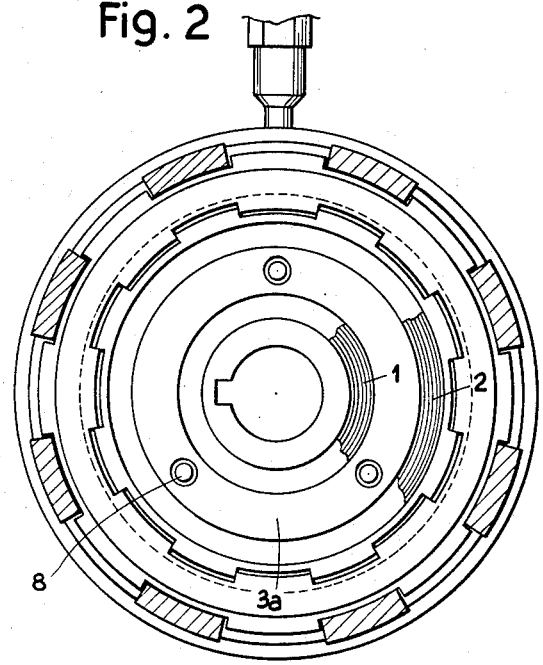
Fig. 2 is a diagrammatic section on the line II—II in Fig. 1.

Referring to Figs. 1 and 2, the two annular windings 1 and 2 of the electromagnet are housed in two concentric grooves 1a and 2a, respectively, in an annular block 3 designed to form the core of the electromagnet and forming a magnetizable core 3a having a front annular surface, between the two housings of the two windings 1 and 2. The walls external to the housing of the winding 2 and internal to the housing of the winding 1, are relatively much thinner than the wall 3a. The armature 4 when axially displaced may be effected by the electromagnetic action of the units 1, 2 and 3. The reference numeral 5 denotes the plates of the clutch which in this case is a friction multi-plate clutch. The commutator ring 6 is for the supply of the windings through a brush supply apparatus 7 and spring-actuated pins 7 normally bear against the armature. The current in the two windings 1 and 2 runs in a reversed direction and, in this way, by appropriately arranging and connecting the two windings, a high magnetization of the section 3a of the core 3 and an annulment of the magnetic effects in all the other zones and in all the members adjacent the core is obtained. Therefore, any magnetization of mechanical members is avoided, both in the clutch and in the machine to which the clutch is combined.

Figure 3:
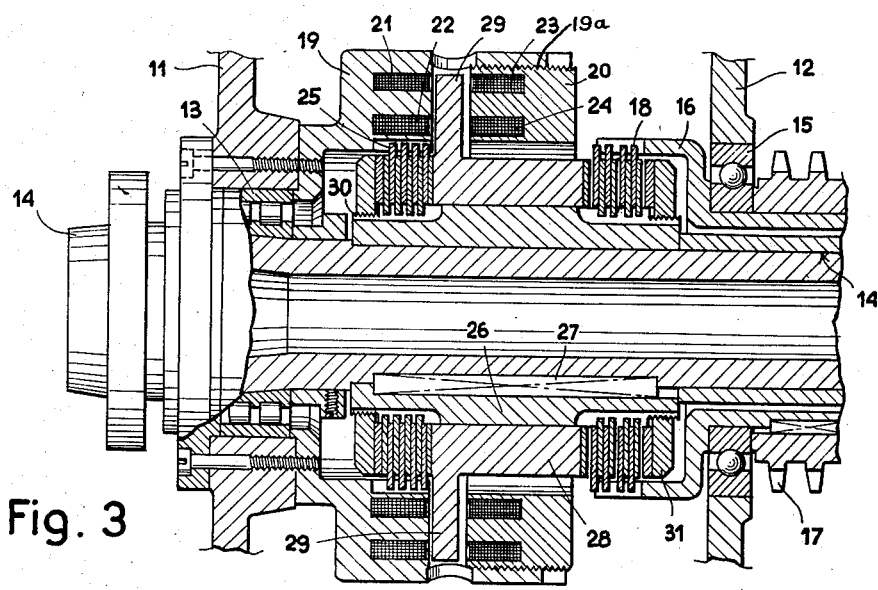
Fig. 3 is a diametrical section of a double clutch provided with stationary electromagnets.

In the embodiment shown in Fig. 3 there is provided a two-position clutch, wherein two stationary electromagnets, according to the invention are used, while the armature is actuated in such a way as not to contact with them or at least not to contact one of the electromagnets. In this way, the sliding contacts such as 6, 7 for the supply of the electromagnets, are avoided. In the construction shown in Fig. 3, the two position-clutch provides for a braking or restraining position and a rotating position.

Two supporting standards 11 and 12 of a stationary structure are shown in Fig. 3 on which a chuck 14, for instance of a lathe or a boring machine, is mounted by means of suitable bearings, of which one bearing 13 is shown. The chuck may however be replaced by any member which may be rotated at different speeds and/or braked in any machine. Additional bearings, such as the bearings 15, are designed to carry a rotary drive member 16 connected, for instance, to a sprocket wheel 17 or the like and engaging a plurality of rings 18 of a multi-plate clutch. Two cores 19 and 20 are secured to the standard 11 and each core forms a housing for two coil windings 21, 22 and 23, 24 in order to form two opposed electromagnets. The core 20 is threadably secured at 19a to the core 19. The core 19 engages the rings 25 of a second multi-plate clutch.

The rings, which are slidably engaged in an annular member 26, co-operate alternately with the plates 18 and the plates 25 and the annular member 26 is engaged for rotation by means of a key 27 to the chuck 14. A sleeve 28, forming the armature 29, is slidably inserted on the member 26 and the armature is included and lies between the two above mentioned electromagnets and may act on the plates 25 or the plates 18 alternately in order to connect the chuck to the member of the driver 16, 17 or in order to restrain it on the core 19 secured to the chuck 14.

The stroke allowed to the armature 28, 29 is effected in such a way that the armature never contacts the cores 19 and 20 but may continue to rotate even when it is picked up by the electromagnet 19, 20, 23, 24 which transmits the rotational motion to the chuck 14. The adjustment of the coupling positions of the armature may be effected, for instance, by means of adjusting rings 30, 31.

As the two cores 19 and 20 are stationary, their supply does not require any sliding blocks.

The mechanism may, obviously, also be designed in such a way as to obtain a two speed clutch or a reversal clutch, instead of a clutch provided with a braking position.

What I claim is:

1. An electromagnetic clutch comprising a stationary structure including a pair of standards, a first circular body forming a ferromagnetic core secured to that side of one of said standards which faces the other of said standards and having a pair of concentric annular recesses formed in that face thereof which is presented toward said other standard, an interiorly threaded annular projection formed integrally with the peripheral portion of that face of said first body which is presented toward said other standard, windings mounted in each of said recesses, a second circular body forming an electromagnetic core externally threaded and engaged in said projection and having a pair of concentric annular recesses in that face thereof facing said first mentioned body, windings mounted in the last-mentioned recesses, said cores having their adjacent faces in spaced in parallel relation to each other, a chuck rotatably mounted in said stationary structure and extending centrally through said cores, an armature slidably mounted on said chuck and having an integrally formed disc-shaped portion extending between the adjacent faces of said cores, a first multi-ring clutch engageable with said first body and said chuck, a second multi-ring clutch engageable with said second body and said chuck, and a pair of adjustable screw members mounted on said chuck for adjusting the longitudinal limits of movement of said armature.

2. A device as defined in claim 1 wherein the outermost windings in each core and the innermost windings in each core are of opposite polarity.

References Cited in the file of this patent

UNITED STATES PATENTS

| | | |
|---|---|---|
| 1,481,655 | Thompson | Jan. 22, 1924 |
| 1,735,648 | Moore | Nov. 12, 1929 |
| 2,233,060 | Parvin | Feb. 25, 1941 |
| 2,725,133 | Winther | Feb. 29, 1955 |

FOREIGN PATENTS

| | | |
|---|---|---|
| 11,091 | Great Britain | of 1887 |
| 98,399 | Sweden | Mar. 19, 1940 |